Oct. 14, 1969　　　A. S. JOHNSON　　　3,472,347
VARIABLE TORQUE CLUTCH

Filed March 8, 1967　　　2 Sheets-Sheet 1

INVENTOR.
ALLAN S. JOHNSON
BY Hergig Walsh & Blackham
ATTORNEYS

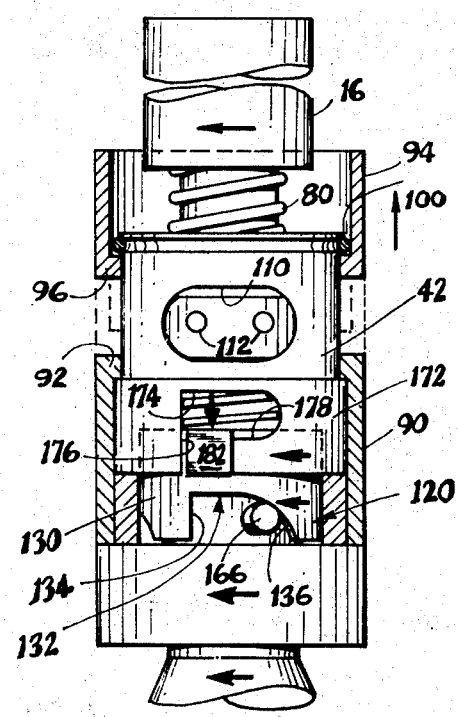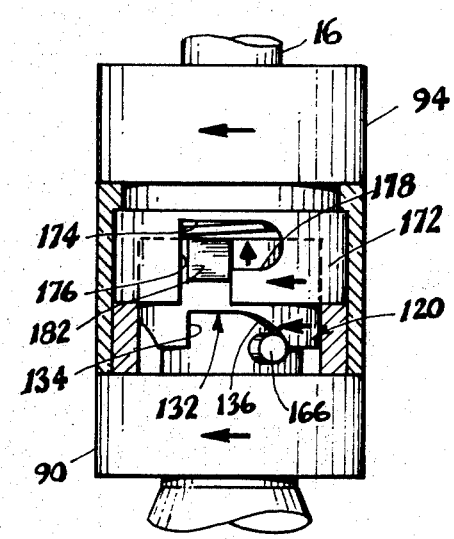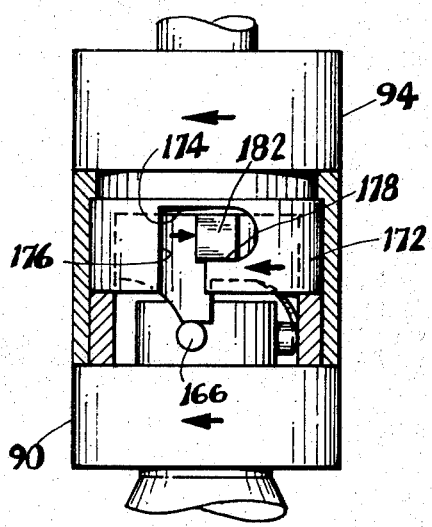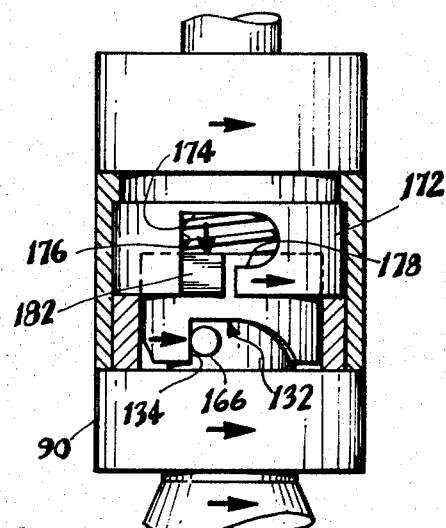

United States Patent Office 3,472,347
Patented Oct. 14, 1969

3,472,347
VARIABLE TORQUE CLUTCH
Allan S. Johnson, Costa Mesa, Calif., assignor to Tapmatic Corporation, Costa Mesa, Calif., a corporation of California
Filed Mar. 8, 1967, Ser. No. 621,549
Int. Cl. F16d 43/20, 11/00, 13/60
U.S. Cl. 192—56     9 Claims

ABSTRACT OF THE DISCLOSURE

The invention is a variable torque clutch particularly adapted for use in tools such as thread cutting or tapping attachments for use with drilling machines, lathes and boring machines. The clutch transmits torque from one axially aligned shaft to another. Upon the occurrence of a predetermined magnitude of torque the clutch releases. The clutch embodies an axially movable clutch driver cup having a depending skirt. This skirt has cut-outs which are engageable with radial pins on the driven shaft. Engagement between the surfaces of the cutouts and the pins is such as to force the spring driver cup axially against a spring. A predetermined torque will cause disengagement. The spring driver cup itself moves within a sleeve or skirt having slots in it which slots have an axial and a circumferential portion so that the pins on the driven shaft can move up into these slots and onto the ledge or shelf formed by the circumferential portions holding the driver cup in inactive position. Upon reversal of direction of the driving shaft the driver cup is released from its held position and it moves axially to provide positive engagement between the driving shaft and the driven shaft whereby to drive the driven shaft in reverse direction.

SUMMARY OF THE INVENTION

The invention is an improved variable torque clutch for transmitting torque between axially aligned driving and driven shafts. The clutch releases upon the occurrence of a predetermined torque being transmitted. Upon reversal of the driving shaft the clutch automatically engages positively for driving the driven shaft in a reverse direction. The torque at which the clutch will release is of course adjustable.

The clutch of the invention may be utilized in various applications and environments. A particular adaptability for use of the invention is in thread cutting or tapping attachments for use with drilling machines, lathes and boring machines, etc. An example of such type of tapping attachment is shown in the prior Patent No. 3,041,893 of Allan S. Johnson.

A primary object of this invention is to provide a simplified, positive acting adjustable torque clutch, and more particularly such a clutch which can be built in small sizes that is, having a relatively small diameter. Accordingly tapping attachments can be made in small diameters having the clutch of this invention incorporated therein. Tapping attachments of relatively small diameter adapt themselves to utilization where space is a critical factor such as in multiple spindle machine tools. Machines may have as many as thirty or forty spindles, and the herein invention adapts itself ideally to such circumstances. In some operations holes to be tapped may be relatively close together such that it is necessary to have tapping attachments small enough in diameter to accommodate them to the closeness together of the centers of the holes, otherwise, it would be necessary to tap the holes one at a time.

The invention, in a preferred form, embodies means on a drive shaft engageable with means on a driven shaft so arranged that the driving torque tends to disengage one of these means from the other. In a preferred form of the invention, a clutch driver sleeve is provided which is driven by the driven shaft and which is biased axially by a spring. The clutch driver sleeve has a skirt with cut-outs in it which engage with radial drive-pins on the driven shaft. The cut-outs have an axial surface and a slanting or curved cam surface. The driver pins engage these cam surfaces in operation which tends to move the clutch driver sleeve in an axial direction against the force of the spring. The clutch driver sleeve operates within a sleeve having a skirt portion having slots in it, the slots each having an axial and a circumferential portion, the latter portion of each slot forming a ledge or shelf. On the clutch driver sleeve are lugs engageable in the slots in the said skirt within which the clutch driver sleeve operates. As the torque increases the clutch driver sleeve is forced axially moving the said lugs axially in the slots in the skirt of the sleeve in which it operates. The cut-outs in the skirt of the clutch driver sleeve disengage from the radial pins, at which time the drive shaft can rotate relative to the clutch driver sleeve sufficiently to bring the said ledges or shelves underneath the lugs on the clutch driver sleeve holding it in a disengaged position. However, in this position its skirt is of such extent as to still have a slight amount of engagement with the radial pins as they rotate. That is, there is a slight degree of interference, insufficient for torque to be transmitted to the driven shaft. When the direction of rotation of the drive shaft is reversed, by reason of the interference engagement between the skirt on the clutch driver sleeve and the radial pins, the drive shaft moves the ledges or shelves of the slots in its skirt out from underneath the lugs on the clutch driver sleeve which is then immediately moved axially so that the cut-outs in its skirt positively engage with the radial pins which now engage with the axial surfaces of the cut-outs to positively transmit drive in the reverse direction to the driven shaft.

In the light of the foregoing, it is a further object of the invention to provide an adjustable torque clutch for transmitting torque between a drive shaft and a driven shaft wherein an axially movable member is provided on one shaft engageable with a member on the other shaft in such a way that at a predetermined torque, the axially movable member is moved out of engagement to interrupt the transmission of torque.

Another object is to provide a clutch as in the foregoing wherein the axially movable member is in the form of a sleeve having a skirt having at least one cut-out engageable with a radial pin on the other shaft, the engagement being such that the torque tends to move the sleeve member axially to effect disengagement.

Another object is to provide a clutch as in the foregoing including means to hold the driving element in disengaged position and to release it upon reversal of direction of the drive shaft whereby to reengage for driving shaft in the opposite direction.

Further objects and additional advantages of the invention will become apparent from the following detailed description and drawings wherein:

FIGURE 5 is a partial view illustrating operation of the adjustable torque clutch;

FIGURE 6 is a view like that of FIGURE 5 showing the clutch in a different position;

FIGURE 7 is a view like that of FIGURES 5 and 6 showing the clutch driver sleeve held in inactive position;

FIGURE 8 is a view like that of FIGURES 5, 6 and 7 showing the clutch in reverse drive position.

Figure 2:
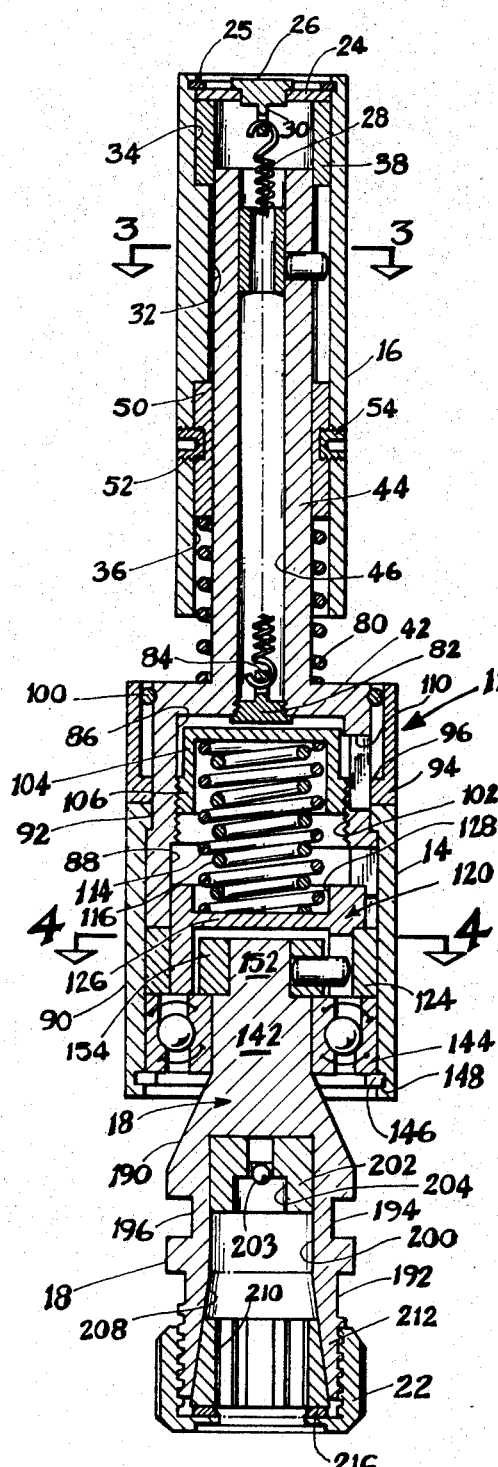
FIGURE 2 is a cross-sectional view of a preferred form of the invention.

The clutch of the invention is illustrated as embodied in a thread cutting or tapping attachment in a drilling machine. The invention might be embodied in attachments providing for either direct drive only or reverse drive as well. The tapping attachment shown is one providing for direct drive; for reverse drive, the machine itself is reversed.

The tapping attachment shown is one embodying free axial float; it should be understood that the invention might be embodied in other forms of tapping attachments or in other types of mechanisms.

Referring now to the drawings, numeral 10 designates the spindle of a machine tool. Numeral 12 designates generally a tapping attachment having the clutch of the invention embodied therein. The tapping attachment has a cylindrical body 14 and an upper sleeve 16 which is received within the holding jaws in spindle 10 of the machine. At the lower end of the tapping attachment is the driven spindle 18 which holds the tapping tool 20, there being a knurled nut 22 on the end of the driven spindle 18.

FIGURE 2 shows the tapping attachment in cross-section. The sleeve 16 is held within the chuck or spindle 10 of the machine. The tapping attachment is able to float axially within this sleeve as will be described. In the upper end of this sleeve is a cap 24 in the form of a disc held by a snap ring 25. In an aperture in the center of this disc is a flanged plug 26 forming a spring hanger for the elongated coil float spring 28. The upper end of this spring is hooked into a bracket 30 on the lower side of the spring hanger 26. The sleeve 16 has a bore 32, an upper counter bore 34 and a lower counter bore 36. In the upper counter bore is a bushing 38 which may be made of suitable oil impregnated material and which forms a bearing.

The attachment comprises a cylindrical body member designated generally at 42 having an upwardly extending cylindrical stem 44 which extends upwardly into the sleeve 16. The stem 44 has a central bore 46, the float spring 28 being in this bore. In the counter bore 36 in the sleeve 16 is another bushing 50 made of oil impregnated material and forming a further bearing for the stem 44. The bushing 50 is held in position by screw members 52 and 54 threaded into openings in the sleeve 16 and in the bushing.

Figure 3:
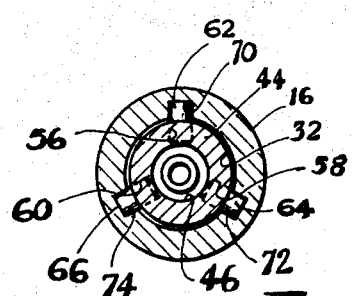
FIGURE 3 is a sectional view taken along line 3—3 of FIGURE 2.

Near the upper end of the stem 44 there are three equally angularly spaced radial bores as designated at 56, 58 and 60 and in these bores are radial drive pins 62, 64 and 66 as may be seen in FIGURE 3. These drive pins move in axial slots 70, 72 and 74 similarly spaced on the inside of sleeve 16. The tapping attachment shown has the characteristic of free axial float and permits the tap to follow its own lead. It is not necessary that the operator apply any lead pressure on the tap once the tap is engaged in the work piece and cutting the thread during the tapping operation. The operator merely moves the machine spindle behind the lead of the tap until the desired depth is reached. These purposes are accommodated and accomplished by the construction described wherein the stem 44 may move vertically relatively with respect to the sleeve 16, the drive pins 62, 64 and 66 moving in the axial slots 70, 72 and 74. The action of the clutch when the direction of rotation is reversed will be described presently.

Numeral 80 designates a coil spring around the stem 44 and acting against the body 42 of the attachment and the bushing 50. This spring urges the body of the attachment downwardly in opposition to the tension of the float spring 28. In the lower end of the bore 46 is a spring retainer 82 threaded into the bore and having an extending projection 84 to which the spring 28 is attached.

The body part 42 has a bore 86 and a counter-bore 88 of slightly larger diameter and forming a skirt at the lower part of the body 42. Numeral 90 designates a cylindrical housing around the body 42 and having an inside flange 92 at the upper end which engages the square shoulder on the body 42 between the upper part of it which is of slightly smaller diameter than the lower part. Numeral 94 designates a movable sleeve around the upper part of the body 42. This sleeve has a flange 96 at the lower part which bears against the outside of the body 42. Numeral 100 designates a snap-ring fitting in a shallow annular groove around the upper end of the body 42. The sleeve 94 is reciprocable upwardly until the flange 96 engages the snap-ring 100. The sleeve 94 is manually movable for purposes that will be described presently.

The body 42 is internally threaded as shown at 102 and in engagement with these threads is a spring retainer cup 104 the lower part of which is of slightly larger diameter and threaded as shown at 106 to engage with the threads 102. In a side wall of the body 42 is an opening 110 having a shape as shown in FIGURE 5. The spring retainer cap 104 has apertures in a side wall thereof as designated at 112. Access may be had to these apertures through the opening 110 so that by means of inserting a tool into the apertures the spring retainer cap 104 can be adjusted for adjusting the tension of two coil springs 114 and 116 which bear against the end of the cap 104 and bias the adjustable clutch as will be described.

Figure 4:
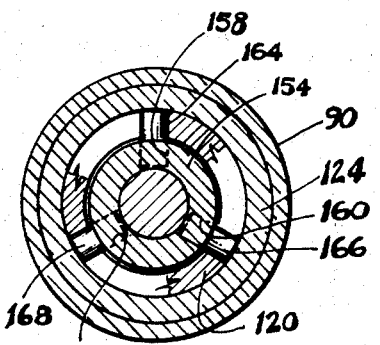
FIGURE 4 is a sectional view taken along the line 4—4 of FIGURE 2.
Figure 1:
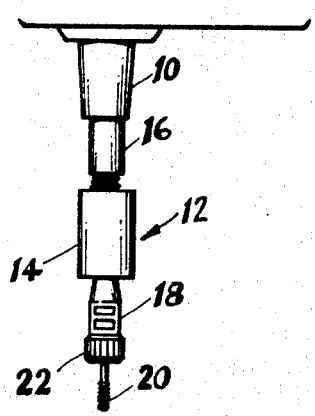
FIGURE 1 is a view of the clutch of the invention embodied in a tapping attachment in a drilling machine.

Numeral 120 designates the clutch driver sleeve which is within the lower part of the body 42, the lower part of which forms a skirt around the clutch driver sleeve 120. At the end of the body 42 is a bushing 124 and the clutch driver sleeve is inside of this bushing. The configuration of the clutch driver sleeve 120 is shown in FIGURES 2 and 5 to 8. It has an intermediate transverse member 126 and on the upper side of this is a shallow bore 128 in which the lower ends of springs 114 and 116 are retained. Below the transverse member 126 is a skirt part 130. In this skirt part there are three cut-outs as shown at 132 in FIGURES 5 to 8. These cut-outs have an axial surface 134 and a curved cam surface as shown at 136. Radial drive pins on the driven spindle are engageable in these cut-outs. The driven spindle is designated at 18. Its upper end part 142 is journalled within a bearing 144 fitting within the lower end of the housing 90 and held by a snap-ring 146 engaging in an internal annular groove 148 in the lower end of the housing 90. The spindle 18 has an upper end part 152 of smaller diameter. Fitting on this end part is a ring 154. This ring has three equally angularly spaced radial bores 158, 160 and 162 in which are drive pins 164, 166 and 168 which as described are engageable in the cut-outs 132 in the clutch driver sleeve 120, see FIGURE 4.

The lower end of the body 42 forms a skirt as designated at 172 in FIGURE 5 and the clutch driver sleeve 120 moves within it. The clutch driver sleeve 120 can rotate relatively to the skirt 172 a limited amount and can move axially relative thereto. In the side walls of the skirt 172 there are formed three slots one of which is shown at 174 in FIGURE 5. These slots have an axial part 176 and a circumferentially extending part 178. On the sides of the clutch driver sleeve 120, equally angularly spaced are three rectangular lugs as shown at 182 in FIGURE 5. When the attachment is being driven in a direction as shown by the arrows in FIGURE 5, cam surface 136 of the clutch driver sleeve 120 bears against the driver pins as shown at 166. This transmits torque to the driven spindle 18. Depending upon the amount of torque, the clutch driver sleeve 120 is forced axially against the biasing springs 114 and 116. The lugs as shown at 182 are in the vertical parts 176 of the slots 174 so that body 42 drives the clutch driver sleeve 120 which drives the driven spindle 18 through the drive pins 164, 166 and 168. At a predetermined torque the lower end of the clutch driver sleeve 120 will over-ride the drive pins as shown at 166, the lugs 182 moving upwardly in the slots 176 into the upper part of slots 174 as illustrated in FIGURES 6 and 7. At a predetermined torque the clutch driver sleeve 120 will have moved up far enough for the lugs 182 to move into the horizontal part 178 of the slots 174 as shown in FIGURE 7. That is, the skirt 172 of the body 42 will rotate relatively to the clutch driver sleeve 120 so that the ledges or shelves formed by the lower side of the circumferential slots 178 will move underneath the lugs 182. In this position of the parts there is a small amount of interference between the lower end of the clutch driver sleeve 120 and the drive pins 164, 166 and 168. This amount of interference is for example .020 of an inch, not being enough for direct drive to be transmitted to the driven spindle. However, upon reversal of the driving shaft, that is, the machine, the body 42 rotates in the opposite direction as indicated by the arrows in FIGURE 8. The engagement of the lower end of the clutch driver sleeve 120 with the drive pins 164, 166 and 168 is sufficient to restrain the clutch driver sleeve 120. Skirt 172 on the body 42 rotates in the direction of the arrows as shown in FIGURE 8 so that the ledges or shelves at the lower part of the circumferential part 178 of the slots 174 moves out from underneath the lugs 182. The springs 114 and 116 now force the clutch driver sleeve 120 axially into the position shown in FIGURE 8 with the lugs 182 in the vertical parts 176 of the slots 174. The axial surfaces 134 of the cut-outs 132 now engage the drive pins 164, 166 and 168 for positive reverse drive of the driven spindle.

The driven spindle 18 has a configuration as shown in cross section in FIGURE 2. It has a tapered part 190 and a lower part 192 with side slots 194 and 196. It has a bore 200 within which are the back jaws 202 which are held by a retainer screw 203. The lower end of the bore 200 is flared outwardly or tapered as shown at 208 and in this tapered part is received an expansible-collapsible tap collected adapted to receive and hold the tap 20. The end of the spindle is threaded as shown at 212 to receive the chuck nut 22 of conventional type, and between the end of this chuck nut and the tap collet 210 is a washer 216. Conventionally the tap collet 210 is constructed of resilient material with axial metal ribs which can be collapsed inwardly to hold the tap.

From the foregoing those skilled in the art will understand the nature of the invention, its construction and the manner in which the stated objects and advantages are realized, as well as the many additional advantages that are apparent from the detailed description. The invention provides a very simple and compact but effective adjustable torque clutch ideally adapted to its purposes.

The foregoing disclosure is representative of a preferred form of the invention and is to be interpreted in an illustrative rather than a limiting sense, the invention to be accorded full scope of the claims appended hereto.

What is claimed is:

1. An adjustable torque clutch comprising in combination a reversible driving shaft, a driven shaft, a first element carried by one of said shafts and axially movable relative thereto, a second element carried by said other shaft, means axially biasing said first element, said elements being interengageable to transmit torque from one shaft to the other, said elements having first mutually engaging surfaces constructed whereby when torque is transmitted through the elements in one direction of rotation the said first element tends to move axially in a direction to disengage the elements, and means whereby upon predetermined axial movement of said first element it is in an axial position wherein the said elements are disengaged for purposes of transmitting torque, means for holding said first element in disengaged position, said last means comprising a member carried by said one of said shafts and rotatable therewith whereby to hold said first element in disengaged position while said one shaft is rotating, and second mutually engageable surfaces on said elements for positive drive therethrough in the other direction of rotation without axial thrust on said first element.

2. A construction as in claim 1 wherein said first element comprises a sleeve portion, the second element comprising a radially extending pin, said sleeve portion having a cut-out adapted to be engaged by said pin, the circumferential end of said cut-out defining said first and second surfaces thereof.

3. A construction as in claim 1 wherein said member has a ledge having a circumferentially extending surface, said first element having a radial projection and being rotatable relative to said ledge whereby the projection is brought into engagement with the ledge to restrain the said first element from axial movement.

4. A construction as in claim 3 wherein said member has a skirt portion having a slot in its end defining an axially extending portion and a circumferentially extending portion, the latter portion forming said ledge.

5. A structure as in claim 4 wherein said projection is positioned to cooperate with the said slot in the skirt of the holding means upon relative movement as between the first element and the holding means.

6. A construction as in claim 2 wherein said cut-out is constructed to form a cam surface engageable with said pin so that upon transmission of torque between the elements the force exerted against the said cam surface urges the first element in an axial direction.

7. A construction as in claim 2 wherein said cut-out has an axially extending surface engageable with said second element when said drive shaft is rotated in a reverse direction for transmitting torque to the driven shaft in reverse direction.

8. A construction as in claim 4 wherein said first element is circular and said first element and said holding means are telescoped together, the said projection on the first element extending radially to engage in the slot in the holding means.

9. An adjustable torque clutch comprising in combination, a driving shaft, a driven shaft, a first element carried by one of said shafts and axially movable relative thereto, a second element carried by said other shaft, means axially biasing said first element, said elements being interengageable to transmit torque from one shaft to the other, said elements having mutually engaging surfaces constructed whereby when torque is transmitted through the elements the said first element tends to move axially in a direction to disengage the elements, means whereby upon predetermined axial movement of said first element it is in an axial position wherein the said elements are disengageed for purposes of transmittting torque, and means for holding said first element in disengaged position, said first element being constructed to have limited engagement with the second element upon relative rotation thereof when the first element is held against axial movement by said holding means, said engagement being sufficient to cause release of said holding means when the direction of rotation of said driving shaft is reversed whereby to re-engage said element with said second element for driving the driven shaft in a reversed direction.

References Cited

UNITED STATES PATENTS

| 1,118,683 | 11/1914 | Rindfleisch | 192—56 |
| 1,953,182 | 4/1934 | Lyon | 192—56 |
| 2,690,090 | 9/1954 | Pederson | 192—56 XR |
| 3,136,400 | 6/1964 | Carr | 192—56 |
| 3,174,599 | 3/1965 | Spyridakis et al. | 192—56 |

MARTIN P. SCHWADRON, Primary Examiner

L. J. PAYNE, Assistant Examiner

U.S. Cl. X.R.

192—46, 114